United States Patent
Depoe, Jr.

(10) Patent No.: US 6,715,161 B1
(45) Date of Patent: Apr. 6, 2004

(54) TOILET TRAINING AID

(76) Inventor: Allan J. Depoe, Jr., 185 Victoria Dr., Fayetteville, GA (US) 30214

( * ) Notice: Subject to any disclaimer, the term of this patent is extended or adjusted under 35 U.S.C. 154(b) by 0 days.

(21) Appl. No.: 10/339,624

(22) Filed: Jan. 10, 2003

(51) Int. Cl.$^7$ ............................................. E03D 11/00
(52) U.S. Cl. ...................................................... 4/254
(58) Field of Search ............................................. 4/254

(56) References Cited

U.S. PATENT DOCUMENTS

| | | | |
|---|---|---|---|
| 2,023,901 A | * 12/1935 | Rhodes | 4/254 |
| 2,120,481 A | 6/1938 | Bentz | 4/254 |
| 2,607,926 A | 8/1952 | De Puy | 4/254 |
| 2,629,882 A | 3/1953 | Blumenshine | 4/254 |
| 2,834,028 A | * 5/1958 | Stanley | 4/254 |
| 2,851,697 A | 9/1958 | Dubay et al. | 4/254 |
| 3,619,820 A | * 11/1971 | Cain et al. | 4/254 |
| 4,205,404 A | 6/1980 | Levins | 4/254 |
| 4,244,064 A | 1/1981 | Parr | 4/254 |
| 4,534,072 A | 8/1985 | Lipski | 4/254 X |
| 4,615,055 A | 10/1986 | Botes | 4/254 X |
| 4,713,846 A | * 12/1987 | Hodroski, Jr. | 4/254 |
| 4,777,672 A | 10/1988 | Gebhard et al. | 4/449 |
| D307,629 S | 5/1990 | Takahashi et al. | D23/296 |
| D310,869 S | 9/1990 | Sedlack | D23/296 |
| 5,524,295 A | 6/1996 | Ford | 4/254 X |
| 6,349,423 B1 | 2/2002 | Kelleher | 4/254 |

FOREIGN PATENT DOCUMENTS

| | | | |
|---|---|---|---|
| GB | 508641 | * 7/1939 | 4/254 |

* cited by examiner

Primary Examiner—Robert M. Fetsuga
(74) Attorney, Agent, or Firm—Litman Law Offices, Ltd.

(57) ABSTRACT

A toilet training aid comprising a platform and set of safety rails. The platform has a cutout that enables it to be placed directly in front of a standard toilet so that the toilet seat over-hangs the platform. A set of adjustable safety handrails provides small children with an added sense of security while using the toilet and can be completely removed if desired.

6 Claims, 3 Drawing Sheets

TOILET TRAINING AID

BACKGROUND OF THE INVENTION

1. Field of the Invention

The present invention relates to an improved toilet training aid having a platform and a set of safety rails designed to give small children, especially male children, the height they need to stand in front of the toilet to urinate, and provides both male and female children with access to the toilet when taking a seated position.

2. Description of the Related Art

Toilet training aids for young children have been the subject of earlier patents. U.S. Pat. No. 4,244,064, issued to Parr, discloses a step stool construction with a U-shaped opening which fits around the base of a toilet. While the apparatus by Parr provides the child with additional height, it fails to provide for the safety of the child while standing on the platform or sitting on the toilet. While U.S. Pat. No. 4,205,404, issued to Levins, shows a toilet training aid comprising multiple steps and two handrails, the plurality of steps requires that the horizontal steps be too narrow to stand comfortably upon, and is configured so that if the male child stands on the top step in order to be close to the toilet, the child is too high off the toilet to urinate safely, and so that if the male child stands on the lowest step for safety's sake, the child is too far from the toilet to urinate without mishap.

Other step constructions are exemplified in U.S. Des. Pat. No. 307,629, issued to Tkahashi et al.; U.S. Des. Pat. No. 310,869, issued to Sedlack; U.S. Pat. No. 2,120,481, issued to Bentz; U.S. Pat. No. 2,607,926, issued to De Puy; U.S. Pat. No. 2,629,882, issued to Blumenshine; U.S. Pat. No. 2,851,697, issued to Dubay et al.; U.S. Pat. No. 4,534,072, issued to Lipski; U.S. Pat. No. 4,615,055, issued to Botes; U.S. Pat. No. 4,777,672, issued to Gebhard et al.; U.S. Pat. No. 5,524,295, issued to Ford, and U.S. Pat. No. U.S. 6,349,423, issued to Kelleher.

While most of the aforementioned toilet aids allow a young child to sit safely on a toilet, none of the above inventions and patents, taken either singly or in combination, is seen to describe the instant invention as claimed. Thus a toilet training aid solving the aforementioned problems is desired.

SUMMARY OF THE INVENTION

The present invention is a toilet training aid for assisting a young child to use an adult-sized toilet during toilet training.

The training aid includes a lightweight platform and handrail combination, which provides a toddler the added height he or she needs to confidently use an adult toilet. The platform is removable, easily stored, and has a U-shaped cutout which allows the platform to fit around the base of the toilet. The adjustable height handrails project up from the platform on either side of the platform and are removable.

Accordingly, it is a principal object of the invention to provide a toilet training aid which will give young toddlers the added height and safety they need in using a standard toilet.

It is another object of the invention to provide a toilet training aid having adjustable height handrails mounted on a platform for accommodating children of different heights.

It is a further object of the invention to provide a toilet training aid having a lightweight platform so that a small child may maneuver the platform up to a toilet to provide the added height necessary to use the toilet.

It is an object of the invention to provide improved elements and arrangements thereof in an apparatus for the purposes described which is lightweight, inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
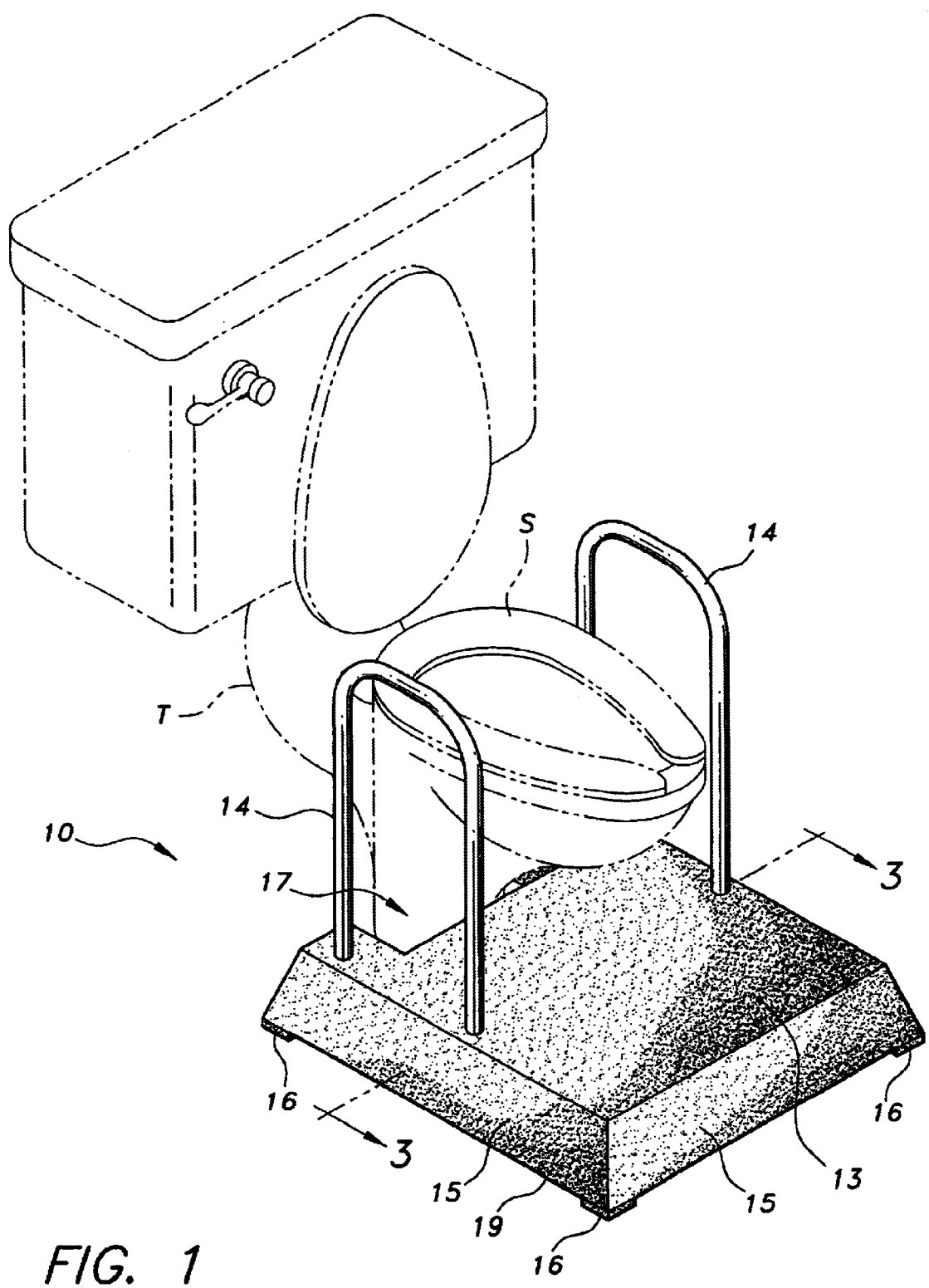
FIG. 1 is an environmental, perspective view of a toilet training aid according to the present invention.

As shown in FIG. 1, the present invention is a toilet training aid 10, the preferred embodiment of which includes a lightweight molded plastic platform 12 and a set of adjustable height safety rails 14 mounted to the platform 12. In another embodiment, the rails 14 may be removed in their entirety.

The platform 12 is a substantially planar, rectangular body having a top surface 13 approximately four inches high with a U-shaped cut-out 17 or recess defining a pair of coplanar legs 23 which extend rearward and are adapted for abutting opposite sides of the base of a toilet bowl T, so that an edge of the platform 12 lies under the front overhang of the toilet bowl T. The top step surface 13 defines a top perimeter of the platform 12 and is knurled to provide a non-slip surface, and the bottom perimeter of the platform 12 is provided with pads or feet 16 having a high coefficient of friction to provide friction with the floor for added safety.

A pair of parallel, generally inverted U-shaped safety rails 14, constructed of lightweight tubular metal, are adapted to be rigidly mounted to either side of the platform 12, such that when the rails 14 are mounted to the platform 12 and the platform 12 is received by the base of a toilet bowl T, each rail extends vertically from the platform 12 toward the front of the toilet seat S, then horizontally and rearwardly towards the rear of the toilet seat S, and then vertically downward toward the platform 12, such that the rails 14 are spaced close to the outer surface of the toilet bowl T and toilet seat S.

Figure 2:
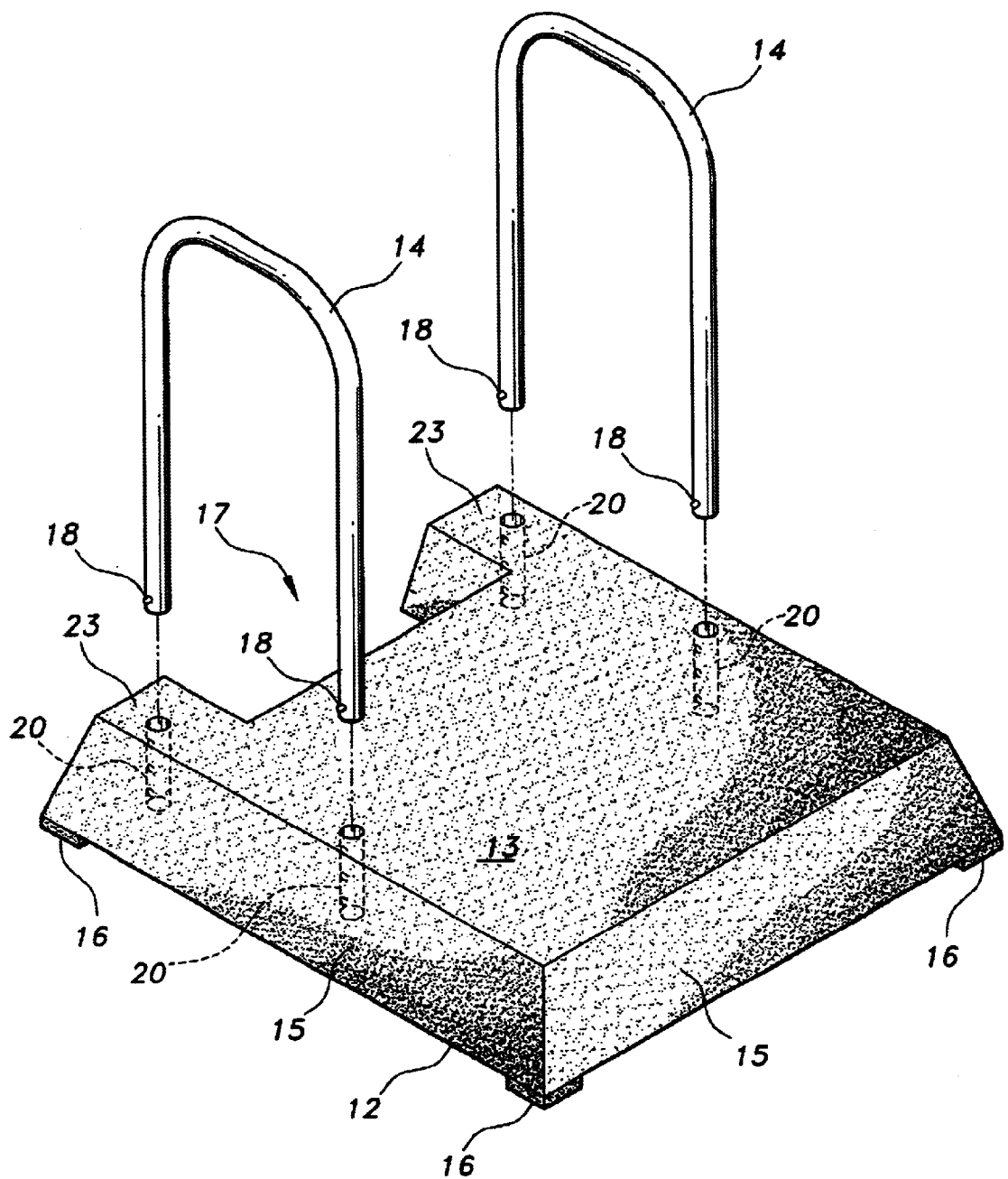
FIG. 2 is an exploded perspective view of the toilet training aid according to the present invention showing the removable and extendible handrails.
Figure 3:
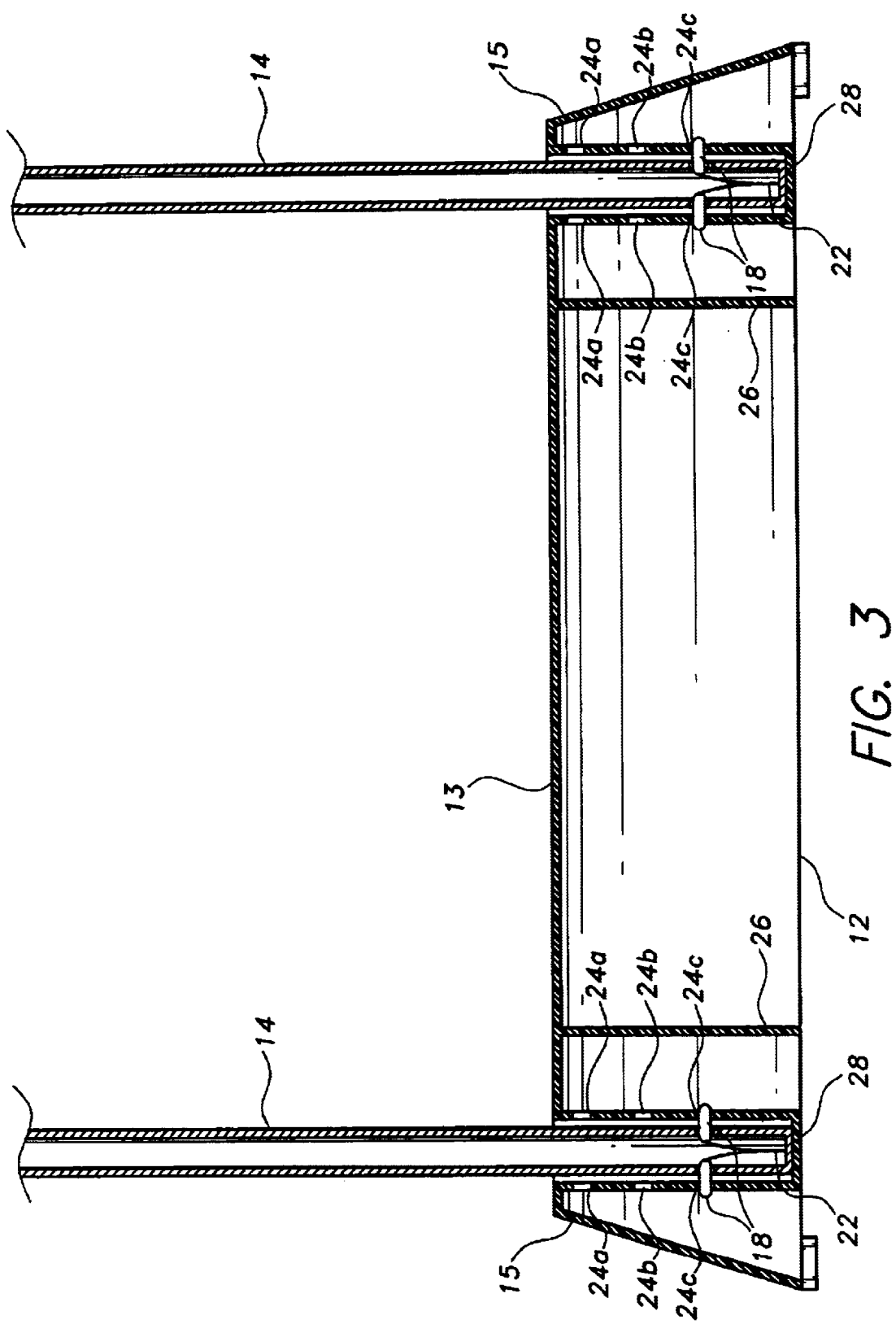
FIG. 3 is a sectional view along the lines 3—3 of FIG. 1.

As shown in FIGS. 2 and 3, each safety rail 14 is adjustable in height and removable in its entirety. A pair of abutment buttons 18 extend through apertures molded in the lower end of each rail 14. The buttons 18 are biased by a spring 22 positioned within the rail 14, and when depressed, permits the rail 14 to be inserted into a well 20 molded in the platform 12. The rail 14 is secured after the buttons 18 are captured by one of three sets of vertically aligned apertures 24a, 24b, and 24c extending transversely through the wells 20. The aforementioned apertures 24a, 24b, and 24c, are vertically spaced approximately one inch apart, the lowest set of apertures 24c, corresponding to the lowest rail height, whereby the bottom of the rail 14 is standing flush on the bottom 28 of the well 20. Adjusting the rail height from one position to another is achieved by reaching underneath the platform 12 and depressing the abutment buttons 18 to release the locking mechanism, thereby allowing the rail 14 to be moved to a new position.

Structural support for the platform 12 is provided by a plurality of reinforcing ribs 26 which are molded into the platform and extend downward from the top surface 13. The vertical support walls 15 depend from and slope away from the top perimeter of the platform 12 to provide a wide, firm base and thereby, minimize the possibility for upsetting the platform 12, as well as to facilitate the manufacturing process.

It is to be understood that the present invention is not limited to the embodiments described above, but encompasses any and all embodiments within the scope of the following claims.

I claim:

1. A toilet training aid for facilitating use of a toilet by a toddler, comprising:
   (a) a platform having:
      (i) a substantially planar, rectangular body having a top surface and a pair of coplanar legs extending from one side thereof defining a U-shaped recess dimensioned and configured for abutting a base of the toilet, the rectangular body and coplanar legs defining a top perimeter of the platform, the legs being disposed on opposite sides of the U-shaped recess; and
      (ii) vertical support walls depending from the top perimeter of the platform;
   (b) a pair of inverted, U-shaped safety rails mounted to the platform, the rails being parallel and extending upward from the top surface of the rectangular body;
   (c) a plurality of spring-biased buttons extending from said safety rails; and
   (d) a plurality of cylindrical wells depending from said rectangular body and said legs, the wells defining a plurality of openings in the top surface of said platform dimensioned and configured for receiving said rails, the wells having a plurality of vertically aligned apertures extending transversely through the wells;
      wherein said spring-biased buttons releasably extend through the aligned apertures in said wells to latch said rails at an adjustable height;
      whereby the platform is placed abutting the toilet so that a child undergoing toilet training steps on the platform in order to reach a toilet bowl.

2. The toilet training aid according to claim 1, wherein said safety rails are tubular.

3. The toilet training aid according to claim 1, wherein the top surface of said platform is knurled for providing traction.

4. The toilet training aid according to claim 1, further comprising a plurality of reinforcing ribs molded into said rectangular body.

5. The toilet training aid according to claim 1, further comprising a plurality of feet attached to said vertical support wall, the feet having a high coefficient of friction in order to prevent sliding of the platform.

6. The toilet training aid according to claim 1, wherein said vertical support walls slope away from the top perimeter of said platform to provide a wide, firm base for the platform.

* * * * *